United States Patent
Eguchi et al.

(10) Patent No.: US 7,411,702 B2
(45) Date of Patent: Aug. 12, 2008

(54) METHOD, APPARATUS, AND COMPUTER PROGRAM PRODUCT FOR EMBEDDING DIGITAL WATERMARK, AND METHOD, APPARATUS, AND COMPUTER PROGRAM PRODUCT FOR EXTRACTING DIGITAL WATERMARK

(75) Inventors: Takami Eguchi, Tokyo (JP); Kitahiro Kaneda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 990 days.

(21) Appl. No.: 10/696,071

(22) Filed: Oct. 28, 2003

(65) Prior Publication Data
US 2004/0091132 A1    May 13, 2004

(30) Foreign Application Priority Data
Nov. 12, 2002  (JP)  ............................. 2002/328518
Oct. 2, 2003    (JP)  ............................. 2003/344374

(51) Int. Cl.
    *G06K 15/00*  (2006.01)
(52) U.S. Cl. .................... 358/3.28; 382/100; 358/1.18; 713/176; 380/54
(58) Field of Classification Search ............... 358/1.18, 358/3.28, 1.9; 382/100; 380/54; 713/176
See application file for complete search history.

(56) References Cited

U.S. PATENT DOCUMENTS

| | | | | | |
|---|---|---|---|---|---|
| 5,629,770 | A | * | 5/1997 | Brassil et al. | 358/426.12 |
| 5,680,478 | A | * | 10/1997 | Wang et al. | 382/176 |
| 5,680,479 | A | * | 10/1997 | Wang et al. | 382/176 |
| 5,854,853 | A | * | 12/1998 | Wang | 382/176 |
| 5,861,619 | A | * | 1/1999 | Horino et al. | 235/470 |
| 6,086,706 | A | * | 7/2000 | Brassil et al. | 156/277 |
| 6,580,804 | B1 | * | 6/2003 | Abe | 382/100 |
| 6,731,775 | B1 | * | 5/2004 | Ancin | 382/100 |
| 6,879,701 | B1 | * | 4/2005 | Rhoads | 382/100 |
| 7,054,465 | B2 | * | 5/2006 | Rhoads | 382/100 |
| 7,139,444 | B2 | * | 11/2006 | Ameline et al. | 382/305 |
| 2002/0013794 | A1 | * | 1/2002 | Carro et al. | 707/534 |
| 2002/0090107 | A1 | * | 7/2002 | Acharya et al. | 382/100 |
| 2002/0104003 | A1 | * | 8/2002 | Iwamura | 713/176 |
| 2003/0128863 | A1 | * | 7/2003 | Hayashi | 382/100 |
| 2003/0149936 | A1 | * | 8/2003 | Tamaru | 715/515 |
| 2003/0235325 | A1 | * | 12/2003 | Ray et al. | 382/100 |

FOREIGN PATENT DOCUMENTS

JP      9-186603  A       7/1997

OTHER PUBLICATIONS

Y. Nakamura and K. Matsui, Digital Watermarking Onto Japanese Document by Sealed Image, Info. Proc. Soc. of Japan Journal, Nov. '97, vol. 38, No. 11, p. 2356, Japan.

* cited by examiner

*Primary Examiner*—Twyler L. Haskins
*Assistant Examiner*—Jacky X Zheng
(74) *Attorney, Agent, or Firm*—Canon U.S.A., Inc., IP Division

(57) ABSTRACT

A method for embedding a digital watermark includes a step of inputting digital watermark information; a step of inputting an image; a step of dividing the image into a plurality of areas; a step of ordering the plurality of areas according to a predetermined ordering criterion; a step of embedding the digital watermark information over the plurality of areas that have been ordered; and a step of outputting an image with the digital watermark information embedded therein.

13 Claims, 17 Drawing Sheets

METHOD, APPARATUS, AND COMPUTER PROGRAM PRODUCT FOR EMBEDDING DIGITAL WATERMARK, AND METHOD, APPARATUS, AND COMPUTER PROGRAM PRODUCT FOR EXTRACTING DIGITAL WATERMARK

BACKGROUND OF THE INVENTION

1. Field of the Invention

The present invention relates to techniques for embedding digital watermark information mainly in document images.

2. Description of the Related Art

Recently, in the trend of networking and digitization of media for text data, image data, audio data, and the like, demand has arisen for prevention of unauthorized copying of digital data and for association of meta data with digital data. Still, however, documents and images are often distributed in the form of printed materials. Since both digital data and printed materials are used as described above, demand has also arisen for techniques for controlling a destination to which digital data is to be distributed in the form of a printed material or linking a printed material with digital data. Under such circumstances, interest has arisen for a method for embedding information by digitally watermarking a multi-level still image or document image.

Embedding of information by digital watermarking is a technique for modifying part of original data to embed information, in a human-unperceivable manner, in digital image data, audio data, or text data.

For example, as techniques for embedding and extracting a digital watermark in and from a multi-level image, various methods based on the redundancy of the intensity levels of pixels are generally known. Also, as a technique for digitally watermarking a document image that is a binary image, several digital watermarking methods based on characteristics specific to document images are known. For example, a method of embedding digital watermark information by changing the length of a space between words of English text (alphabetic text) according to a predetermined criterion is known. Such a method is disclosed, for example, in Japanese Patent Laid-Open No. 9-186603 (U.S. Pat. No. 5,861,619).

According to the digital watermarking method for documents, digital watermark information is represented by varying the lengths of spaces between words or between characters so that one-bit information (either "1" or "0") will be assigned according to the values of the two space lengths.

In another method, digital watermark information is embedded in a character by rotating the character to change a tilt angle thereof. Such techniques are disclosed, for example, in Nakamura and Matsui, "Wa-bunsho heno shiirugazou niyoru denshisukashi" (which could be translated as "Digital Watermarking of Japanese Documents using Seal Images"), November 1997 (Transactions of IPSJ, Vol. 38-No. 11).

A document image in which digital watermark information is embedded according to the related art will be described with reference to FIG. 13. FIG. 13 is a schematic diagram showing an example of a document image in which digital watermark information has been embedded by rotating a character to change a tilt angle thereof according to the related art.

For example, if a character is rotated clockwise, "1" is embedded in the character (as in character (1) in FIG. 13), and if a character is rotated counterclockwise, "0" is embedded in the character (as in character (2) in FIG. 13). Digital watermark may be embedded in continuous characters, at an interval of several characters, or in characters at predetermined positions.

Referring to FIG. 13, since the character (1) is rotated clockwise and the character (2) is rotated counterclockwise, information representing "10" is embedded.

However, regarding embedding of digital watermark information in document images according to the related art, a method of embedding a digital watermark with consideration of the layout of characters in the document image has not been established. For example, when a digital watermark is embedded in a document image by the method according to the related art, a feature regarding each character or each character and an adjacent space is considered. When the layout of the document image is complex, for example, when illustrations, tables and figures, and text areas are mixed or when the document image is multicolumned, if digital watermark information is embedded simply in each of the areas, the digital watermark information becomes discontinuous among the areas. Thus, it is not allowed to embed digital watermark information continuously, which is inconvenient.

SUMMARY OF THE INVENTION

The present invention has been made in view of the problems described above, and it is an object of the present invention to allow a digital watermark to be embedded continuously even in an image in which a plurality of areas is disposed discretely, such as a document image.

In order to achieve the above object, the present invention, in one aspect thereof, provides a method for embedding a digital watermark, including a step of inputting digital watermark information; a step of inputting an image; a step of dividing the image into a plurality of areas; a step of ordering the plurality of areas according to a predetermined ordering criterion; a step of embedding the digital watermark information over the plurality of areas that have been ordered; and a step of outputting an image with the digital watermark information embedded therein.

The present invention, in another aspect thereof, provides an apparatus for embedding a digital watermark, including an input unit for inputting digital watermark information; an image input unit for inputting an image; an area dividing unit for dividing the image into a plurality of areas; an area ordering unit for ordering the plurality of areas according to a predetermined ordering criterion; an embedding unit for embedding the digital watermark information over the plurality of areas that have been ordered; and an output unit for outputting the image with the digital watermark information embedded therein.

The present invention, in another aspect thereof, provides a computer program product storing a program for embedding a digital watermark, the program including a step of inputting digital watermark information; a step of inputting an image; a step of dividing the image into a plurality of areas; a step of ordering the plurality of areas according to a predetermined ordering criterion; a step of embedding the digital watermark information over the plurality of areas that have been ordered; and a step of outputting an image with the digital watermark information embedded therein.

The present invention, in another aspect thereof, provides a method for detecting a digital watermark, including a step of inputting an image with digital watermark information embedded therein; a step of dividing the image into a plurality of areas; a step of ordering the plurality of areas according to a predetermined ordering criterion; a step of detecting the digital watermark information from over the plurality of areas that have been ordered; and a step of outputting the digital watermark information detected.

The present invention, in another aspect thereof, provides an apparatus for detecting a digital watermark, including an input unit for inputting an image with digital watermark information embedded therein; a dividing unit for dividing the image into a plurality of areas; an area ordering unit for ordering the plurality of areas according to a predetermined ordering criterion; a detecting unit for detecting the digital watermark information from over the plurality of areas that have been ordered; and an output unit for outputting the digital watermark information detected.

The present invention, in another aspect thereof, provides a computer program product storing a program for detecting a digital watermark, the program including a step of inputting an image with digital watermark information embedded therein; a step of dividing the image into a plurality of areas; a step of ordering the plurality of areas according to a predetermined ordering criterion; a step of detecting the digital watermark information from over the plurality of areas that have been ordered; and a step of outputting the digital watermark information detected.

Further objects, features and advantages of the present invention will become apparent from the following description of the preferred embodiments with reference to the attached drawings.

DESCRIPTION OF THE PREFERRED EMBODIMENTS

Now, preferred embodiments of the present invention will be described with reference to the drawings.

Algorithms for embedding or extracting digital-watermark information in embodiments described below are only examples, and the present invention can be applied to various embedding or extracting algorithms.

The embodiments will be described mainly with examples where tilt angles of characters are changed.

First Embodiment

First, the configurations of a digital-watermark embedding apparatus and a digital-watermark extracting apparatus according to a first embodiment of the present invention will be described with reference to the drawings.

Figure 16:
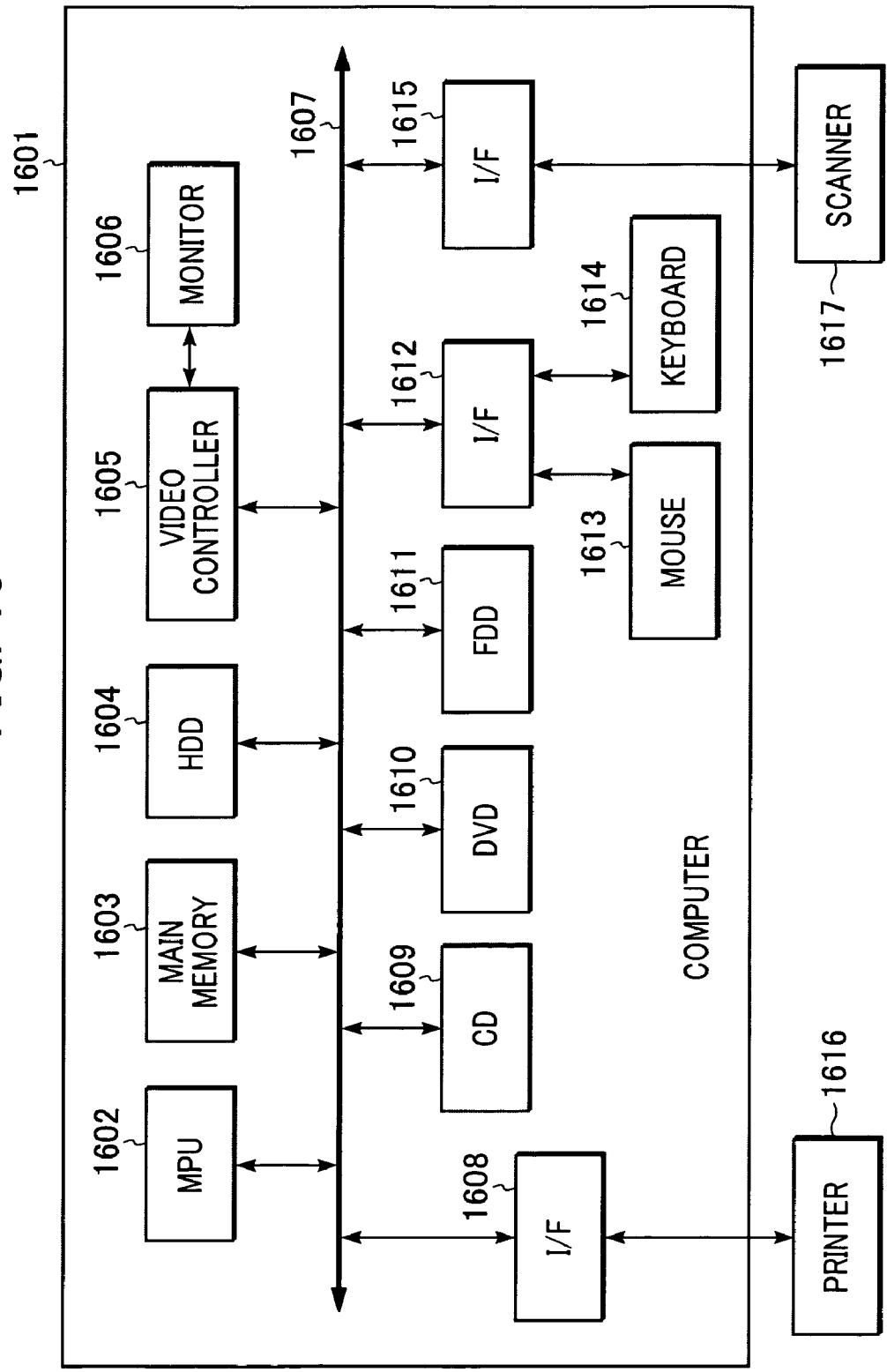
FIG. 16 is a diagram showing the configuration of a common image processing apparatus based on which embodiments of the present invention can be implemented.

FIG. 16 is a diagram showing the electrical configuration of an image processing apparatus for implementing a digital-watermark embedding apparatus or a digital-watermark extracting apparatus according to a first embodiment of the present invention. In order to implement a digital-watermark embedding apparatus or a digital-watermark extracting apparatus, it is not necessary to incorporate all the functions of the blocks shown in FIG. 16.

Referring to FIG. 16, a computer 1601 is, for example, a personal computer that is commonly available. The computer 1601 is capable of receiving an image read by an image inputting apparatus 1617 such as a scanner, and editing or storing the image. Also, the computer 1601 allows the image obtained by the image inputting apparatus 1617 to be printed by a printer 1616. A user is allowed to issue various commands using a mouse 1613, a keyboard 1614, or the like.

Inside the computer 1601, blocks described below are connected to each other via a bus 1607 so that various data can be exchanged among the blocks. Referring to FIG. 16, an MPU 1602 is capable of controlling the operations of the blocks in the computer 1601, or executing programs that are stored internally. A main memory 1603 temporarily stores programs or image data to be processed for processing executed by the MPU 1602.

A hard disk drive (HDD) 1604 is capable of storing programs or image data to be transferred to the main memory 1603, etc., and storing image data that have been processed.

A scanner interface (I/F) 1615 is connected to a scanner 1617 for reading an original document, a film, or the like and generating image data, allowing input of image data obtained by the scanner 1617. A printer interface 1608 is connected to the printer 1616 for printing image data, allowing image data for printing to be transferred to the printer 1616.

A compact disk (CD) drive 1609 allows reading data from or writing data to a CD (CD-R/CD-RW), which is a type of external storage medium. Similar to the CD drive 1609, a floppy disk drive (FDD) 1611 allows reading data from and writing data to a floppy disk.

A digital versatile disk (DVD) drive 1610 allows reading data from and writing data to a DVD, similar to the FDD 1611. If a program for editing an image or a printer driver is stored in a CD, FDD, DVD, or the like, the program is installed on the HDD 1604 and is transferred to the main memory 1603 as required.

An interface (I/F) 1612 is connected to the mouse 1613 and a keyboard 1614 in order to accept commands input from these devices. A monitor 1606 allows display of results of extracting digital watermark information and status of processing. A video controller 1605 sends display data to the monitor 1606.

The present invention may be applied either to a system composed of a plurality of apparatuses (e.g., a host computer, an interface device, a reader, a printer, etc.), or to a single apparatus (e.g., a copying machine, a facsimile machine, or the like).

Figure 1:
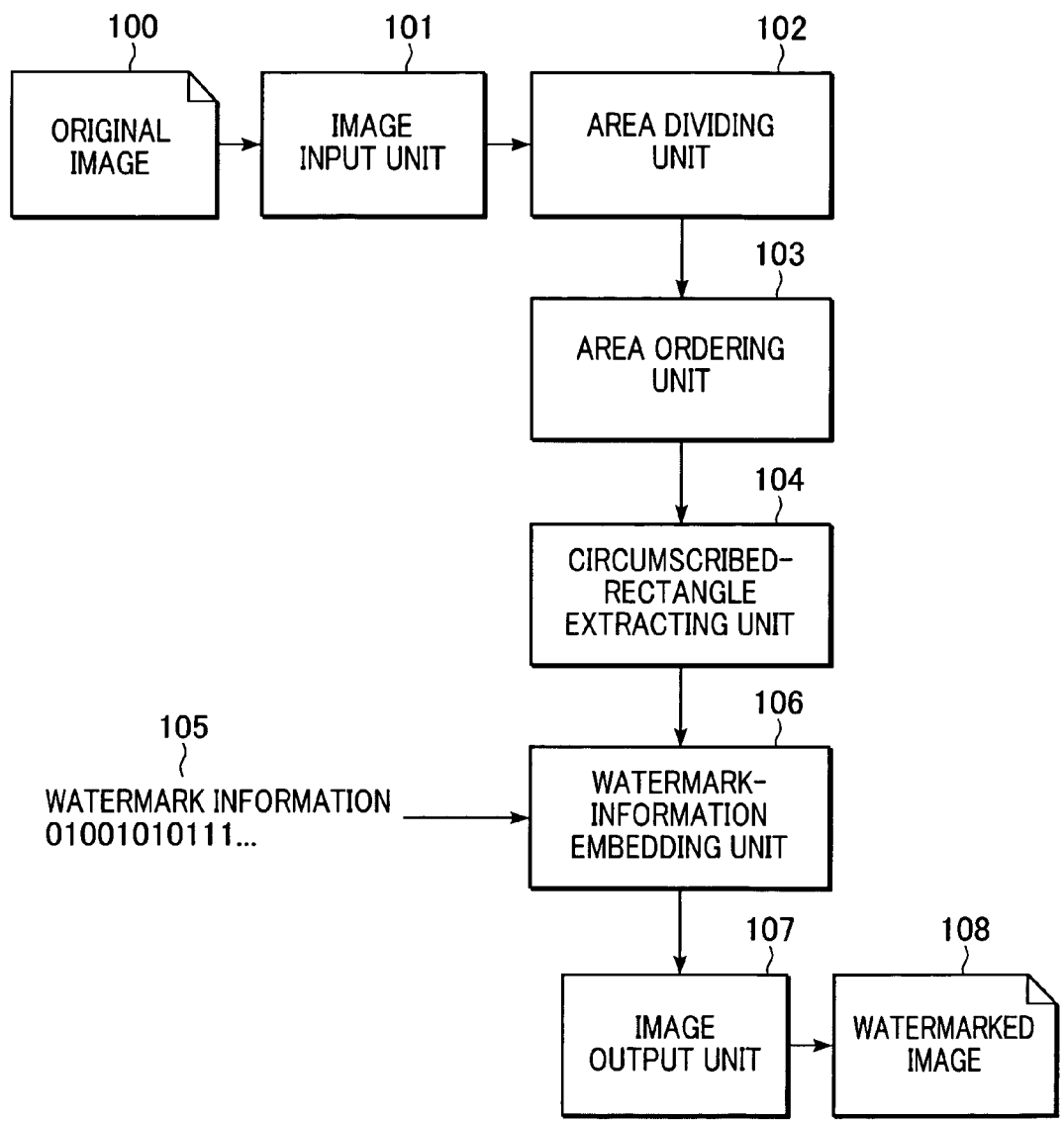
FIG. 1 is a block diagram of a digital-watermark embedding apparatus according to a first embodiment of the present invention.

FIG. 1 is a block diagram showing the configuration of a digital-watermark embedding apparatus according to the first embodiment of the present invention.

Figure 3:
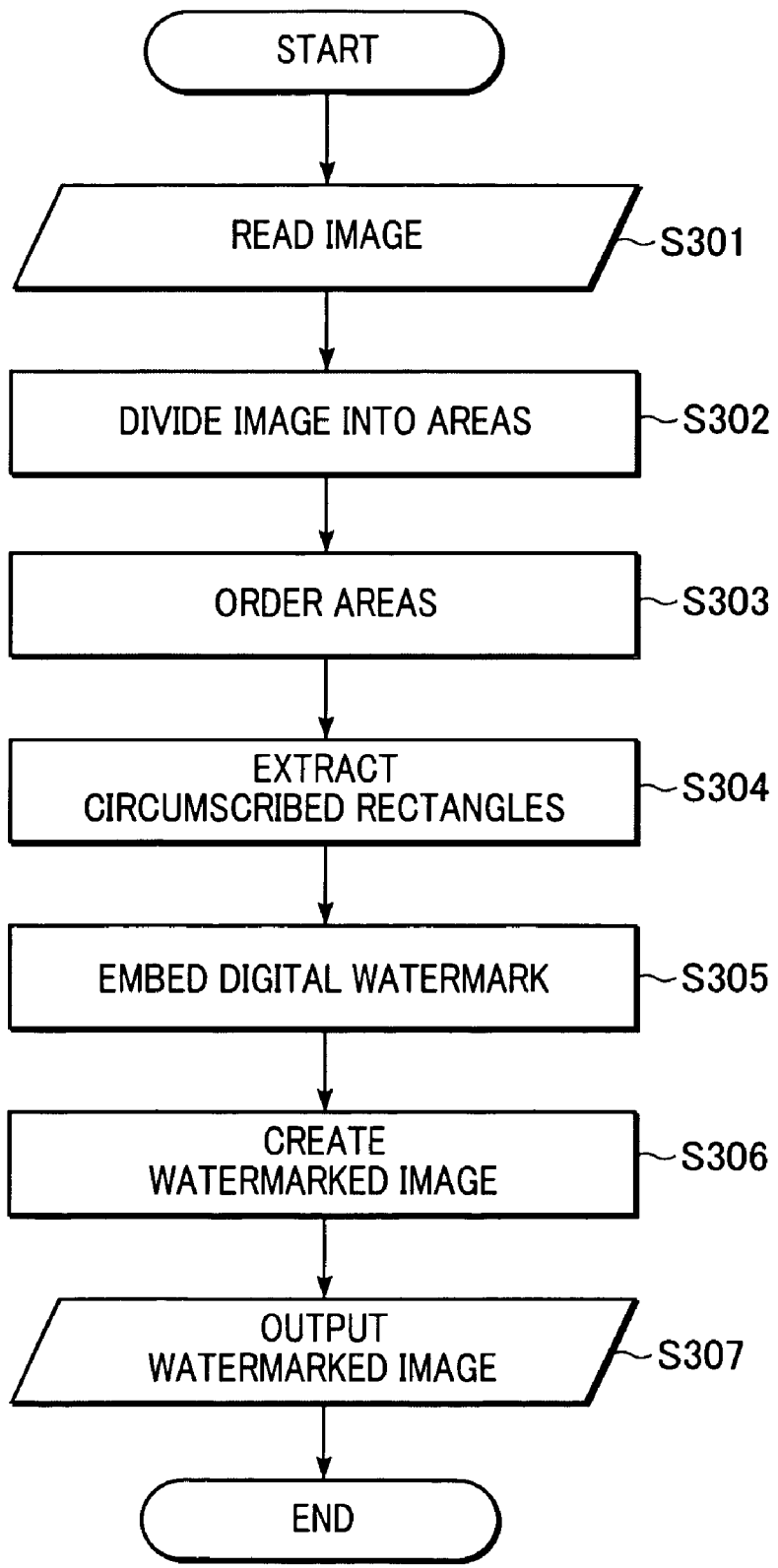
FIG. 3 is a flowchart showing the procedure of a process for embedding digital watermark information.

FIG. 3 is a flowchart showing the procedure of a digital-watermark embedding process execute by the digital-watermark embedding apparatus according to the first embodiment. The operation is achieved by the information processing apparatus shown in FIG. 16, more specifically, by the MPU 1602 executing a program loaded in the main memory 1603 in response to a command input from the mouse 1613 or the keyboard 1614. It is also possible to monitor execution status and results of execution on the monitor 1606.

First, in step S301, a document image (original image) 100 in which digital watermark information is to be embedded is input to an area dividing unit 102 via an image input unit 101 such as the scanner 1617 shown in FIG. 16.

The document image is obtained, for example, by inputting a printed material from the scanner 1617 or the like and bitmapping the image. Alternatively, the document image may be obtained by using image processing software to convert and bitmap electronic data generated using a document-editing application program, or various electronic data in an application-specific format, a text format, etc., stored on the HDD 1604, or a storage medium connected to the CD drive 1609, the DVD drive 1610, the FDD 1611, etc.

In step S302, the area dividing unit 102 divides the input document image into a plurality of property areas, such as text areas, graphic areas, graph areas, and table areas.

Then, in step S303, an area ordering unit 103 orders areas having text property according to a rule described below.

Although various ordering criteria for ordering areas can be employed, in this embodiment, as an example, document areas are ordered in decreasing order of size.

Watermarks are usually embedded in a document by units of each character (or each character and an adjacent space) in the document. For example, assuming that the sizes of the respective characters in the document are substantially the same, a large amount of digital watermark information can be embedded in a document area of a large size.

By embedding desired digital watermark information continuously with priority given to document area of large sizes, the number of document areas to be concatenated for embedding the digital watermark information thereover is reduced. Thus, ordering by size is a valid ordering method.

Similarly, document areas may be ordered by decreasing order of the number of characters included in document area, that is, from document areas including larger numbers of characters to document areas including smaller numbers of characters. This method is particularly effective in a case where the size of characters considerably differs from document area to document area.

When a plurality of document (text) areas has been successfully ordered unambiguously, circumscribed rectangles are extracted and a digital watermark is embedded in subsequent steps assuming the plurality of text areas having been ordered as a continuous text (string). The area ordering unit 103 allows digital watermark information to be embedded continuously without dependency on various layouts, and the continuous digital watermark information to be extracted from the plurality of areas.

Figure 6:
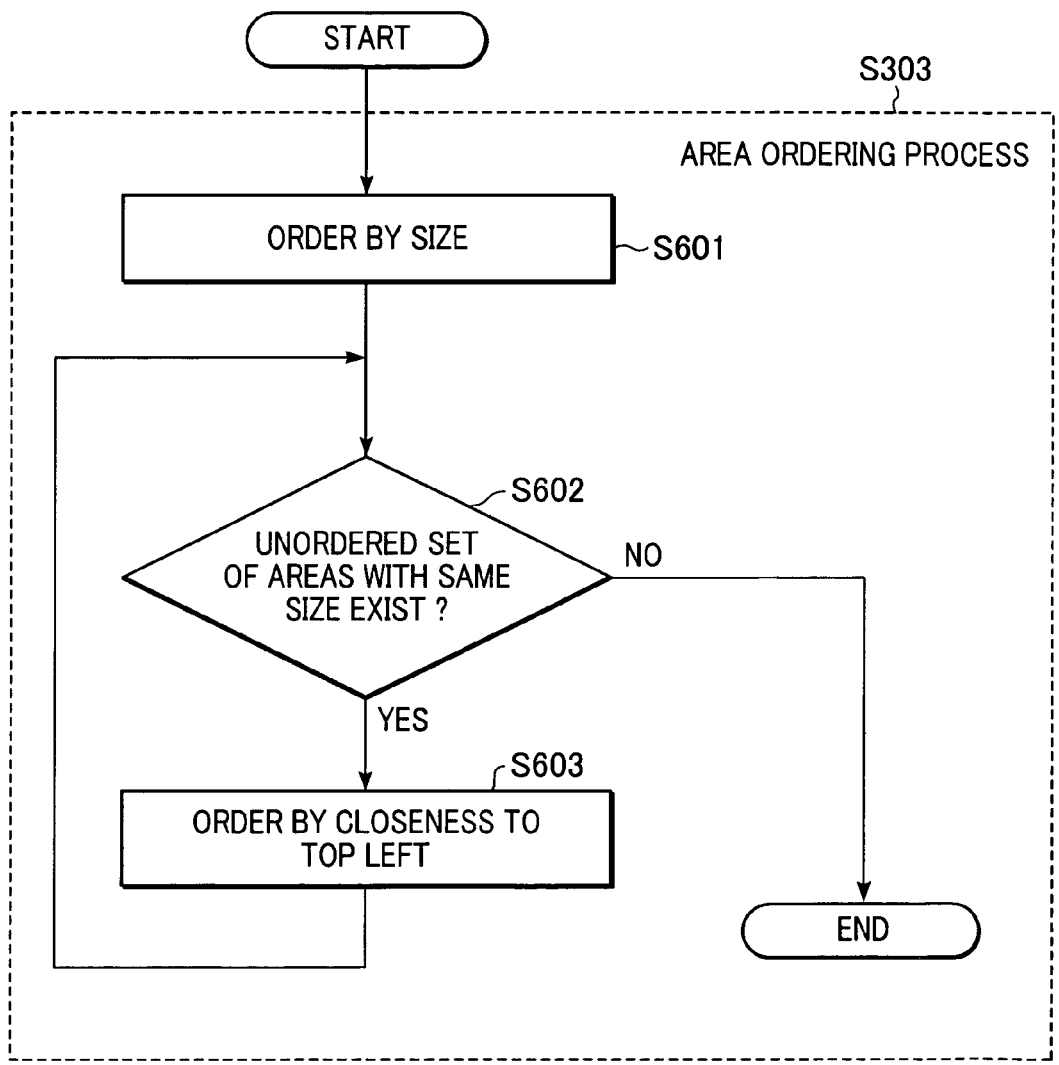
FIG. 6 is a diagram for explaining an example of an ordering process in an area-ordering unit.

FIG. 6 is a flowchart for explaining an example method of a text-area ordering process executed by the area ordering unit 103. That is, the process corresponds to step S303 in the flowchart shown in FIG. 3.

First, in step S601, text areas are ordered according to the sizes of the areas. This alone is not sufficient to order all the areas if areas with the same size exist. Thus, next in step S602, it is determined whether areas with the same size exist. If areas with the same size exist (YES), the areas with the same size are ordered according to a second criterion. In this embodiment, in step S603, for each of the relevant areas, a distance from the top left of the document image is calculated, and the areas are ordered from in increasing order of the distance. This ordering is applied to each set of areas with the same size. On the other hand, if areas with the same size do not exist (NO), the ordering process is exited.

Figure 8:
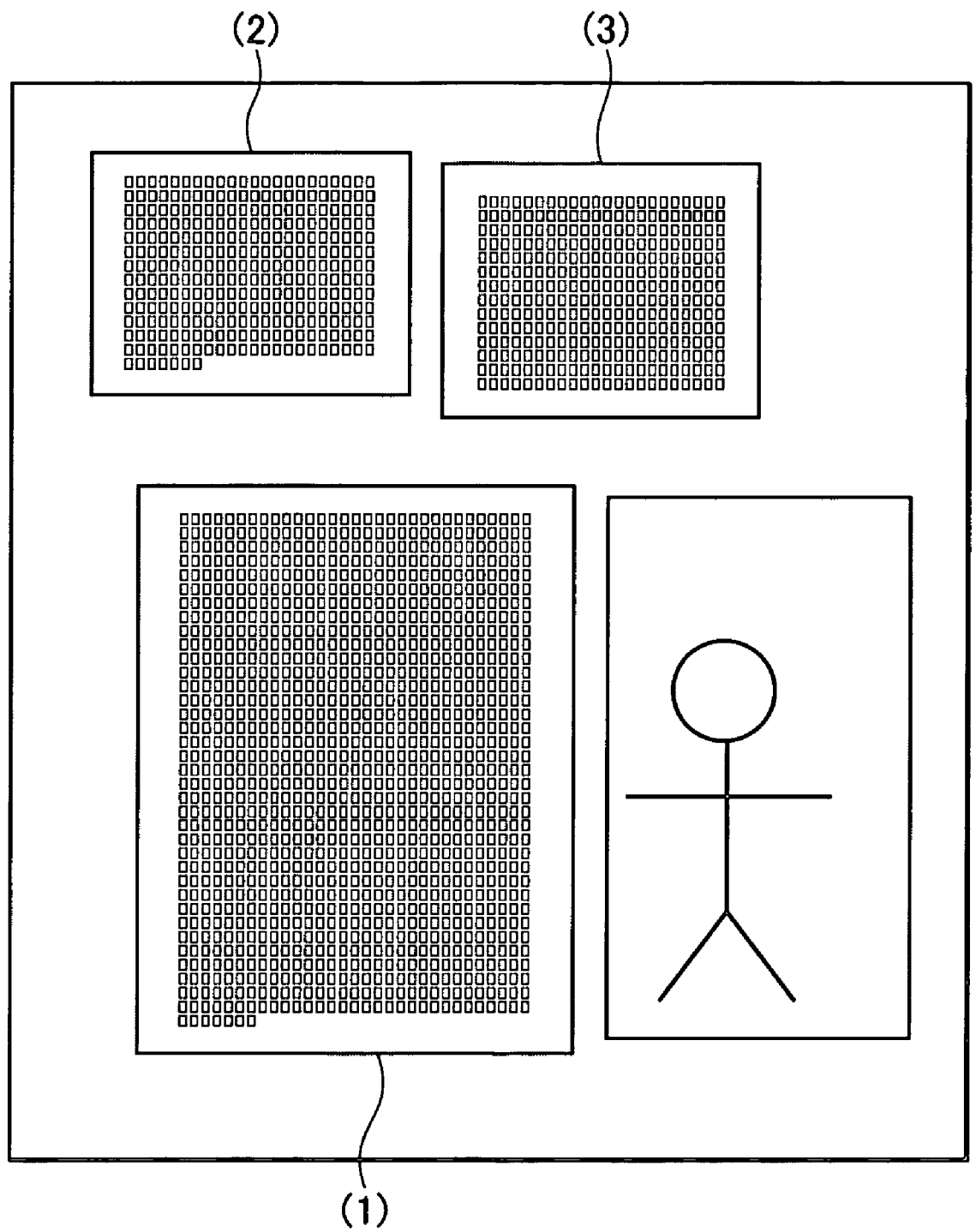
FIG. 8 is a diagram showing a result of dividing a document image into areas and ordering the areas.

FIG. 8 is a diagram showing an example of the result of ordering areas of a document image according to the first embodiment. Referring to FIG. 8, an area (1) having a largest size is ordered as the first area. An area (2) and an area (3) have the same size, so that as described above, the area (2), with a smaller distance to the top left, is ordered before the area (3).

Then, in step S304, a circumscribed-rectangle extracting unit 104 extracts rectangles circumscribed to characters included in each of the areas that have been ordered. Rectangles circumscribed to characters have been known as information that represents areas in which characters are to be recognized. In a digital watermark in this embodiment, circumscribed rectangles are used to represent respective character areas where digital watermark information is to be embedded. A method of detecting circumscribed rectangles will be briefly described below. First, pixel values of a document image (document areas) are projected to the vertical coordinate axis, and blank portions (portions where characters in black are not present) are found for division on a row-by-row basis. Then, each of the rows of the document image is projected to the horizontal coordinate axis, and blank portions are found to divide the row on a character-by-character basis. Thus, rectangles circumscribed to the respective characters are obtained.

Then, a digital-watermark-information embedding unit 106 embeds digital watermark information 105 input thereto in the document areas as a digital watermark. As a method of embedding digital watermark information by the digital-watermark-information embedding unit 106 in this embodiment, a procedure of embedding a digital watermark by rotating characters to change the tilt angles thereof will be described. However, the present invention covers cases where digital watermark information is embedded by other methods, for example, by adjusting the length of space between characters. This method will be described later.

Figure 5:
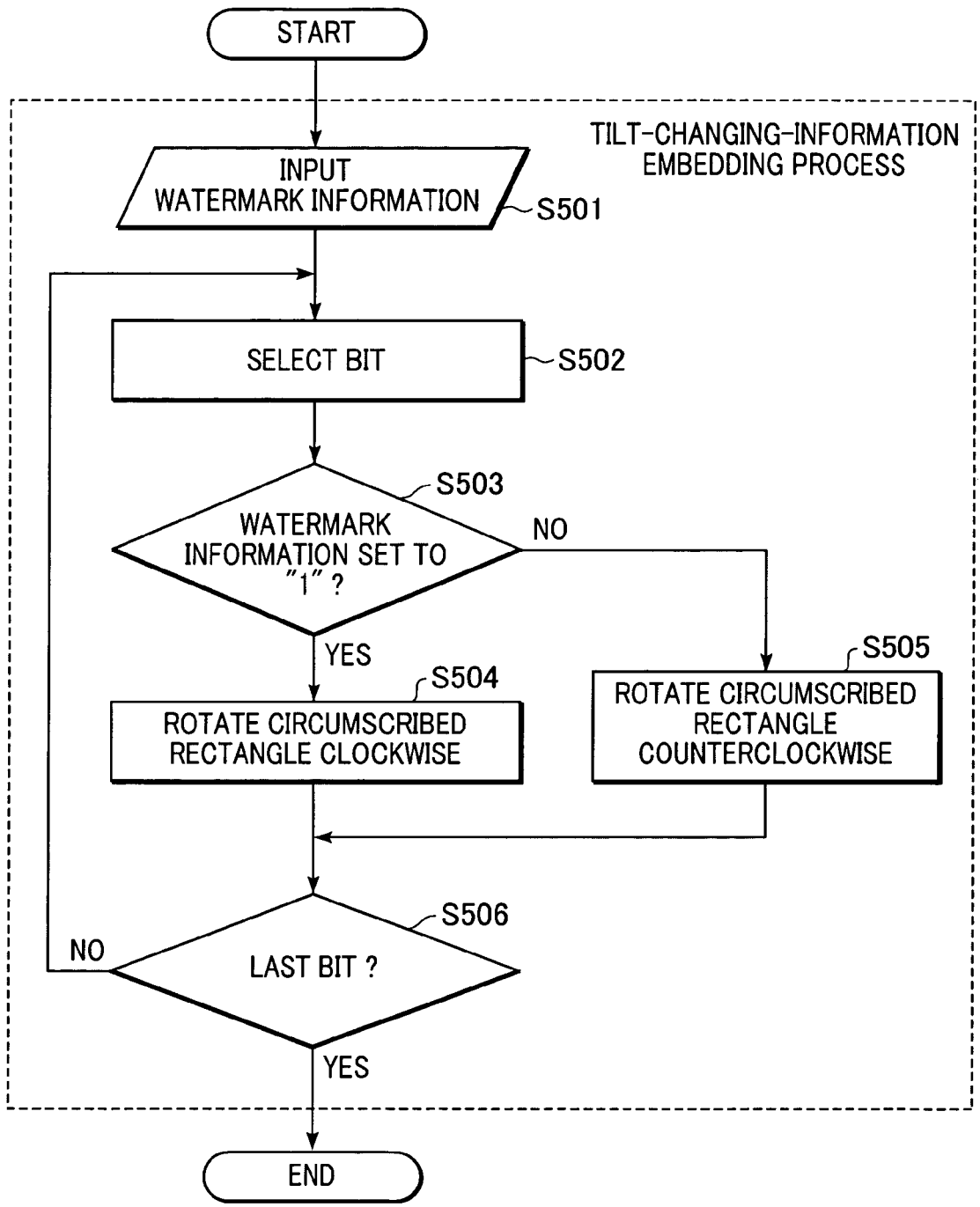
FIG. 5 is a diagram for explaining an example method of a method for embedding a digital watermark.

FIG. 5 is a flowchart for explaining an example of a method for embedding a digital watermark by changing the tilt angles of characters. That is, the method corresponds to step S305 in the flowchart shown in FIG. 3. First, in step S501, digital watermark information to be embedded is input. Then, in step S502, a bit to be embedded next is selected from a group of bits constituting the digital watermark information, and a character in which the bit is to be embedded is selected. Then, in step S503, it is determined whether the value of the digital-watermark-information bit to be embedded is "1". If the bit is determined as "1" (Yes), the tilt angle of the character currently selected is changed clockwise in step S504. On the other hand, if the bit is determined as "0" (No), the tilt angle of the character currently selected is changed counterclockwise in step S505.

Furthermore, it is possible to increase the amount of information (the number of bits) that can be embedded in a single character by assigning meaning to absolute values of tilt angles.

For example, suppose that the range of rotation of characters is 0° to 16° and that the tilt angle can be changed by steps of two degrees. When the tilt angle is changed counterclockwise by steps of two degrees, digital watermark information represents "0", "1", . . . , and "7". When the tilt angle is changed clockwise by steps of two degrees, digital watermark information represents "8", "9", . . . , and "15". More specifically, if a character has been rotated counterclockwise by two degrees, it is determined that digital watermark information representing "0" is embedded in the character. If a character has been rotated counterclockwise by four degrees, it is determined that digital watermark information representing "1" is embedded in the character. If a character has been rotated counterclockwise by 16°, it is determined that digital watermark information representing "7" is embedded in the character. If a character has been rotated clockwise by two degrees, it is determined that digital watermark information representing "8" is embedded in the character. If a character has been rotated clockwise by four degrees, it is determined that digital watermark information representing "9" is embedded in the character. If a character has been rotated clockwise by 16°, it is determined that digital watermark information representing "15" is embedded in the character. Accordingly, four bits of information, i.e., one of sixteen values of information, can be embedded in a single character.

Then, in step S506, it is determined whether the character currently selected is the last character of the document (in which a plurality of document areas has been ordered). If the character currently selected is determined as the last character of the document (Yes), the process of embedding digital watermark information (bits) is exited. On the other hand, if it is determined that the character currently selected is not the last character of the document (No), the procedure returns to step S502, in which a next character is selected.

In steps S306 and S307, the image in which digital watermark information has been embedded is created and outputted as a watermarked image 108 from the image output unit 107 such as the printer 1616. The output may be in the form of, for example, printing, storage in a storage device, or transmission to another terminal via a network.

As described above, in the digital-watermark embedding apparatus according to this embodiment, first, the original image 100 in which digital watermark information 105 is to be embedded is input from the image input unit 101, and the original image 100 is divided into a plurality of areas in the area dividing unit 102. Then, in the area ordering unit 103, the plurality of divided areas is ordered according to a predetermined ordering criterion. Then, in the digital-watermark-information embedding unit 106, the digital watermark information 105 is embedded in the ordered areas as a digital watermark, and the watermarked image 108 with the digital watermark information 105 embedded therein is output from the image output unit 107.

Next, an apparatus and method for extracting digital watermark information embedded in the manner described above from a document image (digital-watermark extracting apparatus and digital-watermark extracting method) will be described.

Figure 2:
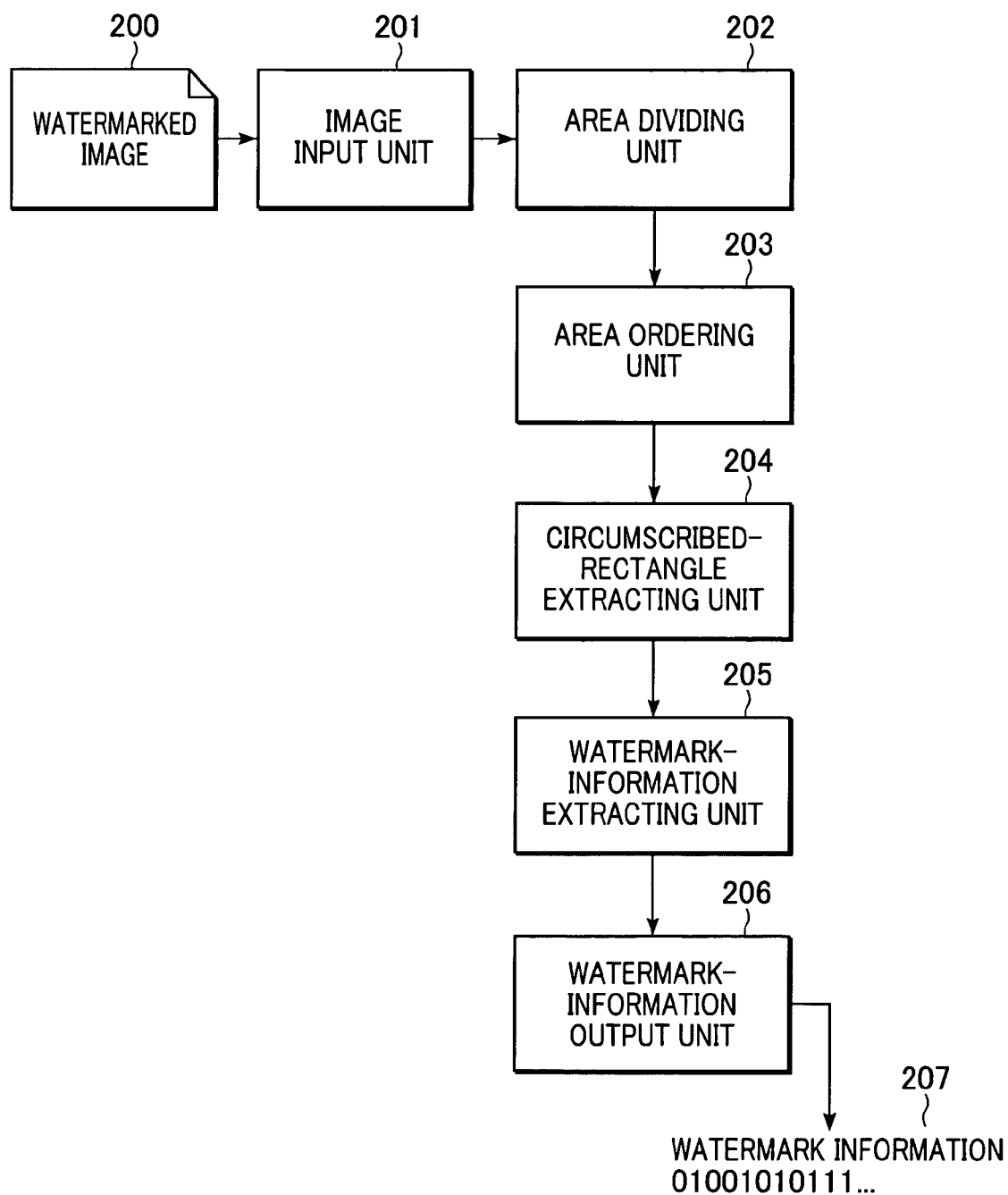
FIG. 2 is a block diagram of a digital-watermark extracting apparatus, according to the first embodiment, for extracting digital watermark information embedded in a document.

FIG. 2 is a block diagram showing the configuration of a digital-watermark extracting apparatus according to the first embodiment, for extracting digital watermark information embedded in a document in the manner described above. Referring to FIG. 2, an image input unit 201 is connected to the scanner 1617 to allow input of a document image optically read by the scanner 1617. The image input unit 201 may be a device that itself is capable of functioning as a scanner, or a device for receiving data via a network. The image input unit 201 is also connected to an area dividing unit 202.

The area dividing unit 202 has the same functions as the area dividing unit 102 described earlier, and it is connected to an area ordering unit 203. The area ordering unit 203 has the same functions as the area ordering unit 103 described earlier, and it is connected to a circumscribed-rectangle extracting unit 204. The circumscribed-rectangle extracting unit 204 has the same functions as the circumscribed-rectangle extracting unit 104 described earlier, and it is connected to a digital-watermark-information extracting unit 205. A digital-watermark-information output unit 206 is connected to the monitor 1606 and the digital-watermark-information extracting unit 205, and it is used for outputting digital watermark information 207 extracted to the outside. The digital-watermark-information output unit 206 may be a device that includes the monitor 1606, or a device that outputs data via a network.

That is, according to the present invention, an apparatus for extracting a digital watermark from a document includes the image input unit 201 for inputting a document in which digital watermark information has been embedded as a digitized document image, the area dividing unit 202 for dividing the document image into a plurality of areas, the area ordering unit 203 for ordering the areas, the circumscribed-rectangle extracting unit 204, and the digital-watermark-information extracting unit 205 for extracting the embedded digital watermark information based on a tilt angle of a character extracted, wherein the digital watermark information 207 is extracted assuming a plurality of text areas as a continuous string.

Figure 4:
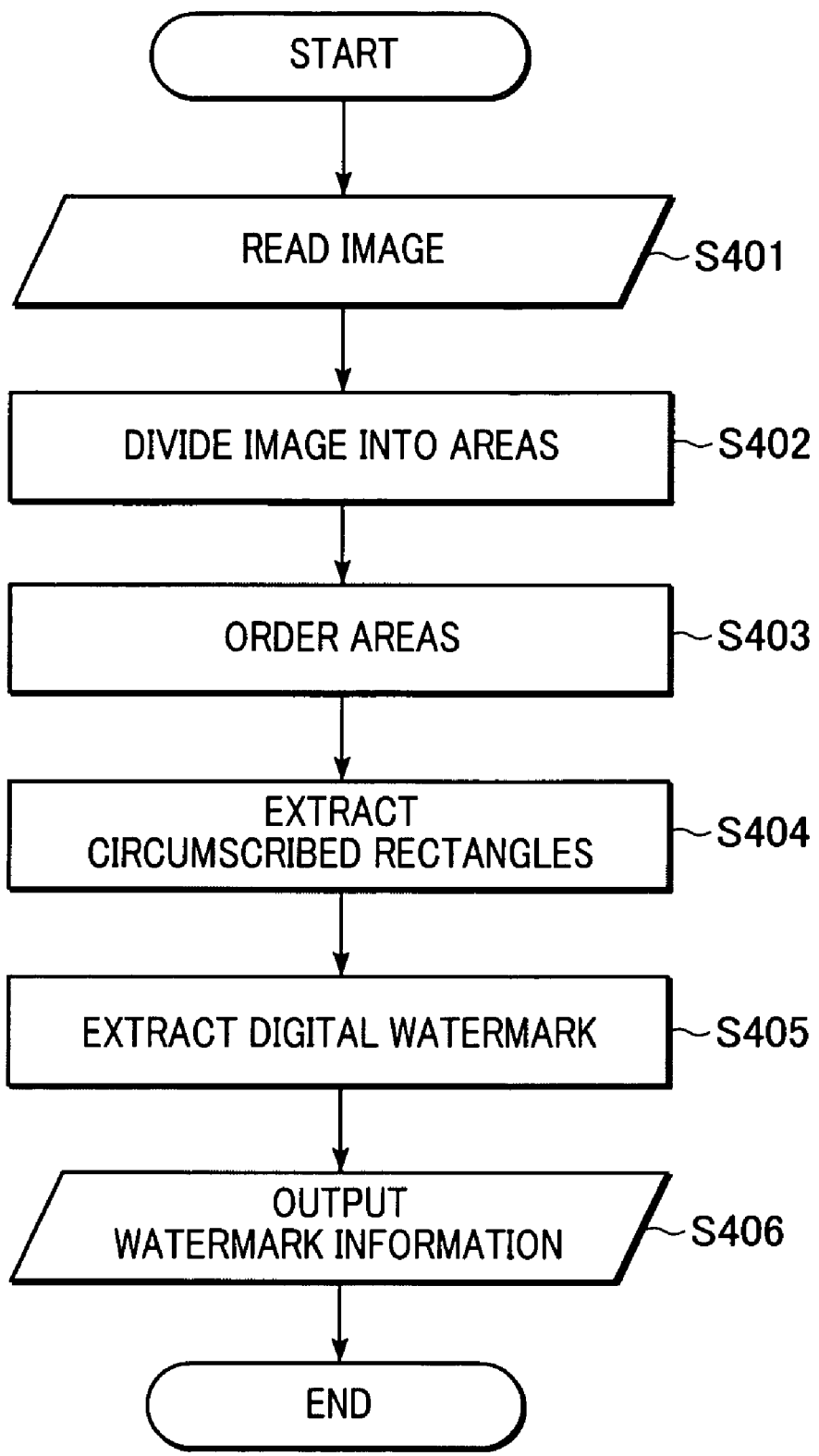
FIG. 4 is a flowchart showing the procedure of a process for extracting digital watermark information.

Next, the procedure of a process of extracting a digital watermark by the digital-watermark extracting apparatus described above will be described. FIG. 4 is a flowchart for explaining the procedure of the process for extracting a digital watermark by the digital-watermark extracting apparatus according to the first embodiment.

First, in step S401, a document image 200 in which digital watermark information is to be extracted is input to the area dividing unit 202 via the image input unit 201 such as the scanner 1617 shown in FIG. 16. The document image may be obtained, for example, by inputting a printed material from the scanner 1617 and bitmapping the image, or using image processing software to convert and bitmap electronic data generated using a document-editing application program, or various electronic data stored on the HDD 1604, or a storage medium connected to the CD drive 1609, the DVD drive 1610, the FDD 1611, or the like. In step S402, the area dividing unit 202 divides the input document image into a plurality of property areas such as text areas, graphic areas, graph areas, and table areas.

Then, in step S403, the area ordering unit 203 orders the areas having text property according to the same criterion used for embedding the digital watermark information. Then, in step S404, the circumscribed-rectangle extracting unit 204 extracts rectangles circumscribed to the respective areas that have been ordered.

Figure 7:
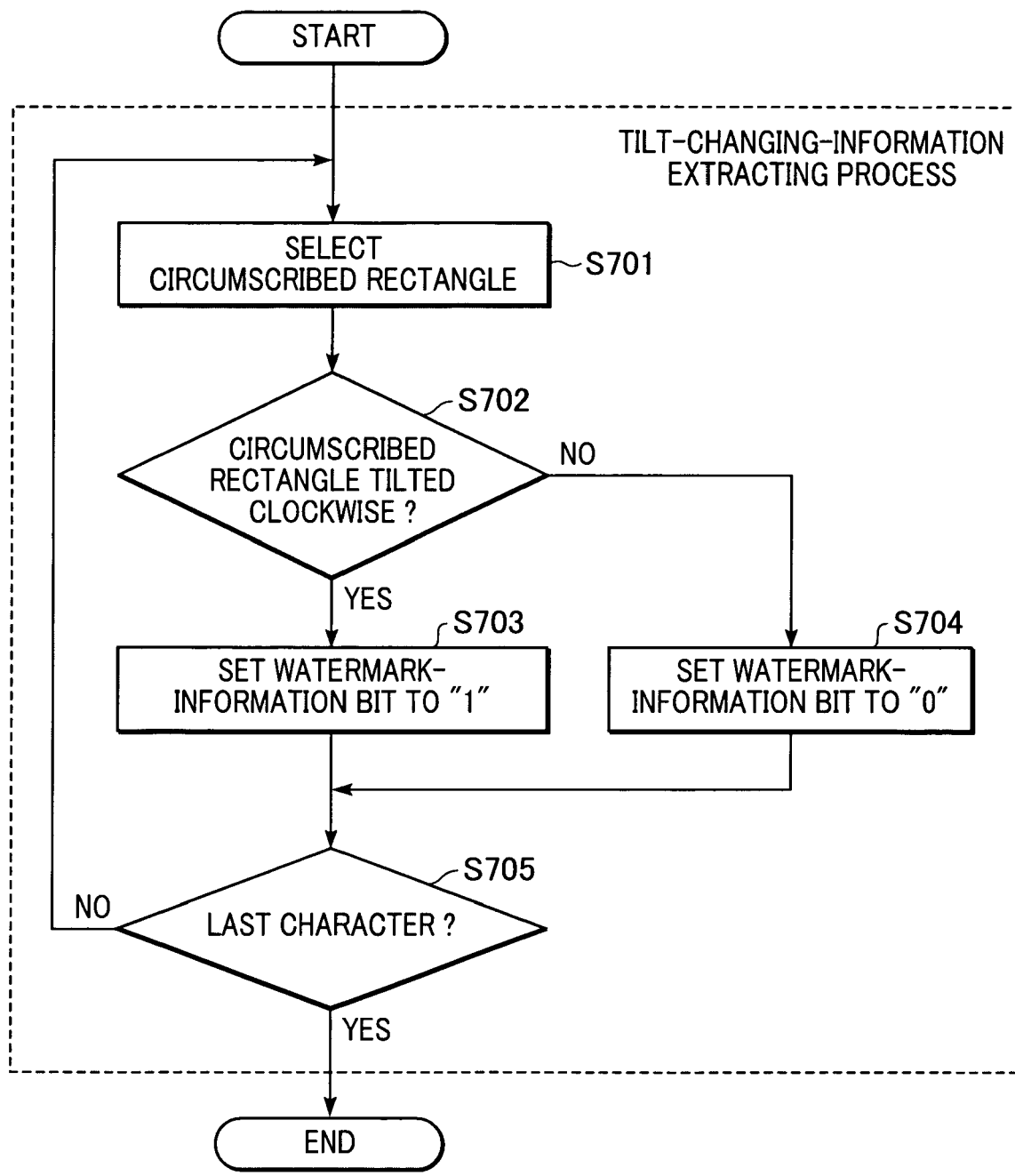
FIG. 7 is a diagram for explaining a digital-watermark extracting process in a digital-watermark extracting unit.

Then, in step S405, a digital-watermark extracting process is executed by the digital-watermark extracting unit 205. FIG. 7 is a flowchart for explaining in detail the digital-watermark extracting process in the digital watermark extracting unit 205. That is, the process corresponds to step S405 in the flowchart shown in FIG. 4. First, in step S701, a circumscribed rectangle is selected. Then, in step S702, it is determined whether the circumscribed rectangle is tilted clockwise. If the circumscribed rectangle is determined as tilted clockwise (YES), it is determined in step S703 that the digital-watermark-information bit represents "1". On the other hand, if the circumscribed rectangle is determined as tilted counterclockwise (NO), it is determined in step S704 that the digital-watermark-information bit represents "0". In step S705, it is determined whether the character in the circumscribed rectangle is the last character. If the character is the last character, the process is exited. If the character is not the last character, the process returns to step S701, in which a next circumscribed rectangle is selected.

After the extraction is completed, in step S406, the digital watermark information that has been extracted is output by the digital-watermark-information output unit 206 such as the monitor 1606.

In the embodiment described above, document areas are ordered by size, the number of characters included, etc. so that the document areas will be ordered in accordance with the amount of digital watermark information that can be embedded in the respective document areas.

However, the present invention also covers ordering of areas according to other criteria.

For example, three parameters are known to be important in digital watermarking techniques. Namely, the three parameters are the "amount of information" of digital watermark information that can be embedded in an image, "robustness" that allows digital watermark information to be correctly extracted even after an image in which the digital watermark information is embedded has been modified, and degradation of "image quality" that occurs when digital watermark information is embedded in an image.

In the embodiment described above, the ordering criterion relates to the "amount of information".

As modifications of the embodiment, in some cases, it will be effective to relate the ordering criterion to "robustness" or "image quality".

Figure 17:
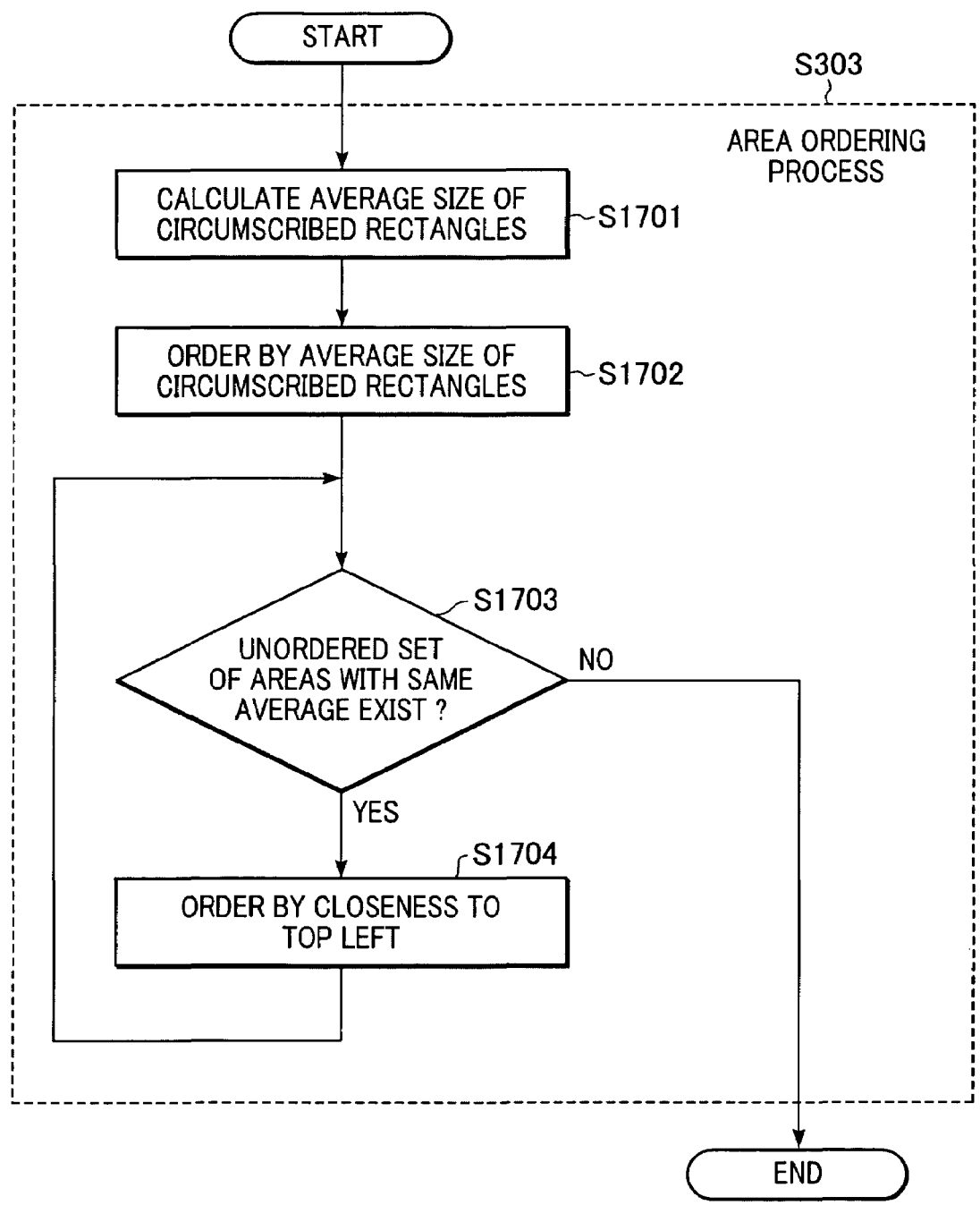
FIG. 17 is a diagram for explaining the procedure of a process for embedding digital watermark information according to a modification.

If the ordering criterion is to be related to "robustness", document areas are ordered in decreasing order of the size of characters included in each of the document areas. For that purpose, the order of steps S303 and S304 shown in FIG. 3 is reversed, and step S303 shown in FIG. 6 is replaced by step S303 shown in FIG. 17. The procedure becomes as follows. When an image has been divided into areas by the area dividing unit 102 or 202 in step S302, prior to ordering the areas in step S303, the circumscribed-rectangle extracting unit 104 or 204 in step S304 extracts circumscribed rectangles.

Then, in step S303, the average size of circumscribed rectangles in each of the areas is calculated in step S1701. Then, the areas are ordered according to the average values in step S1702.

If it is determined in step S1703 that a set of areas having the same average value exists, the areas are ordered in step S1704 based on the coordinate values thereof according to the second criterion described earlier.

Subsequent steps (S305 and later) are the same as the corresponding steps in the embodiment described earlier.

If the ordering criterion is to be related to "image quality", areas are ordered with as much consideration as possible paid for the user to areas where a watermark is embedded, that is, areas where image quality will be degraded. For example, a title constitutes an area that is likely to be noticed, so that degradation in image quality will be noticeable if a digital watermark is embedded therein. In this example, an area where a user does not wish to embed digital watermark is specified interactively, and the area specified is exempted from ordering.

Figure 18:
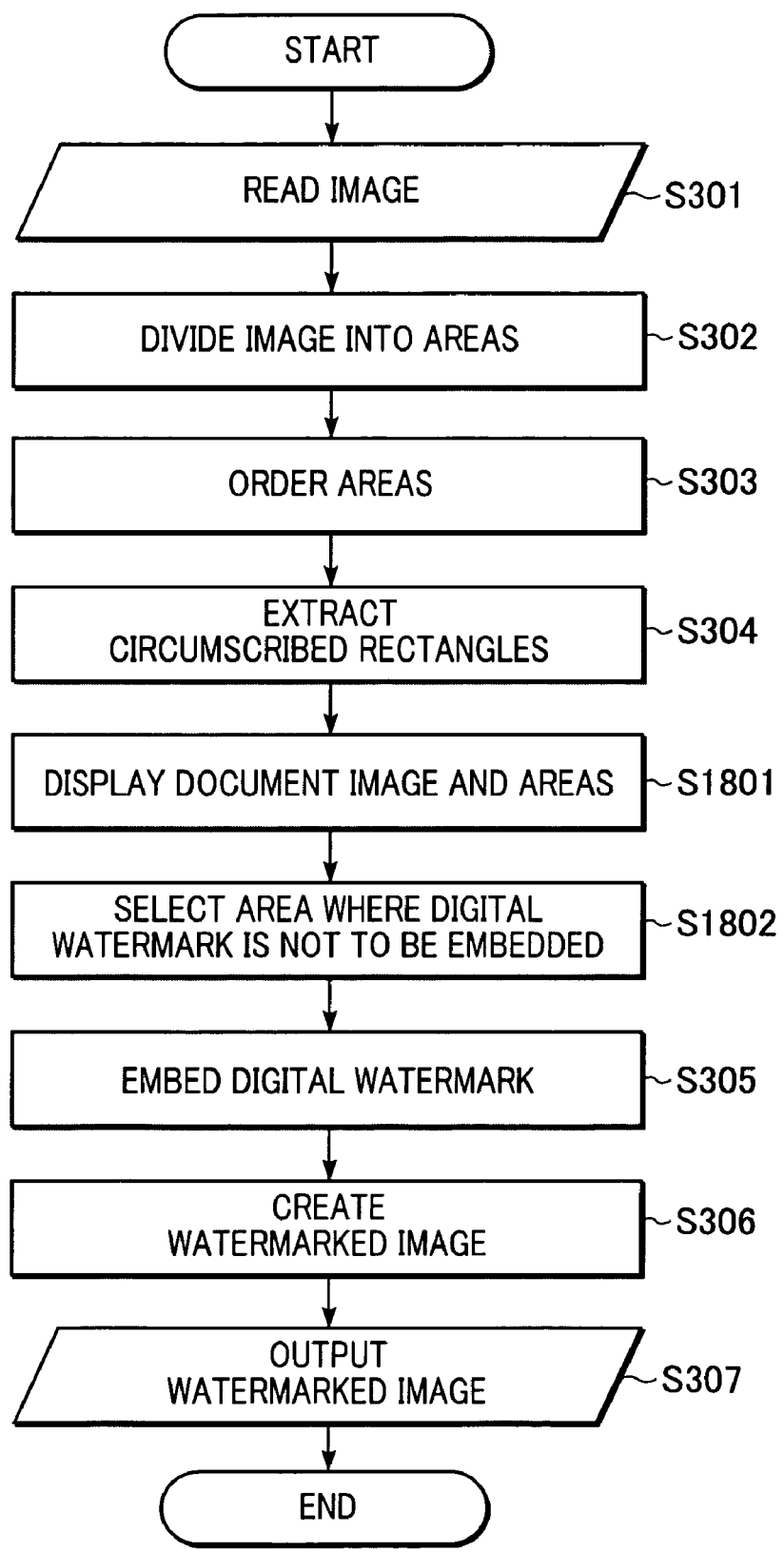
FIG. 18 is a diagram for explaining an example of a process for ordering document areas according to a modification.

FIG. 18 is a flowchart showing a procedure of the above operation. The procedure shown in FIG. 18 is basically the same as that shown in FIG. 3. However, steps described below differ. Next to step S304, the result of division into areas is displayed over the document image on the monitor 1606 in step S1801, as shown in FIG. 8. Then, in step S1802, the user is allowed to select which of the areas is to be exempted from embedding of a digital watermark. Subsequent steps (S305 and later) are the same as the corresponding steps in the embodiment described earlier.

As will be understood from the procedure described above, the ordering based on "image quality" can be employed in combination with the ordering based on "amount of information".

Also, an ordering criterion based on a combination of "image quality" and "robustness" can be employed by inserting steps S1801 and S1802 in the ordering operation based on "robustness" (i.e., the flowchart in which the order of steps S303 and S304 is reversed).

An ordering criterion based on a combination of a plurality of parameters will be even more effective.

As described above, in the first embodiment, a plurality of character areas is processed as a continuous character area. Accordingly, information can be efficiently embedded in a limited size of character areas.

Second Embodiment

In the first embodiment described above, a plurality of character areas is processed as a continuous character area, so that information can be embedded efficiently in a limited size of area. According to the method, a method of ordering must be common between embedding side and extracting side. However, it could be considered useless to perform the same ordering operation at the extracting side as well as the embedding side. A second embodiment described below is based on such idea, in which ordering is performed based on relatively easy analysis of areas at the extracting side.

Furthermore, although this embodiment will be described in relation to an example where the number of bits to be embedded in each area is calculated, and each area is divided into smallest units (hereinafter referred to as "frames") before an embedding algorithm is applied. Note, however, the present invention is not limited thereto. In this embodiment, in the first frame of each area, information indicating an order of the area is written (embedded) as a digital watermark. Thus, the extracting side is allowed to order areas easily without examining characteristics of the areas as specifically as in the first embodiment.

Figure 12:
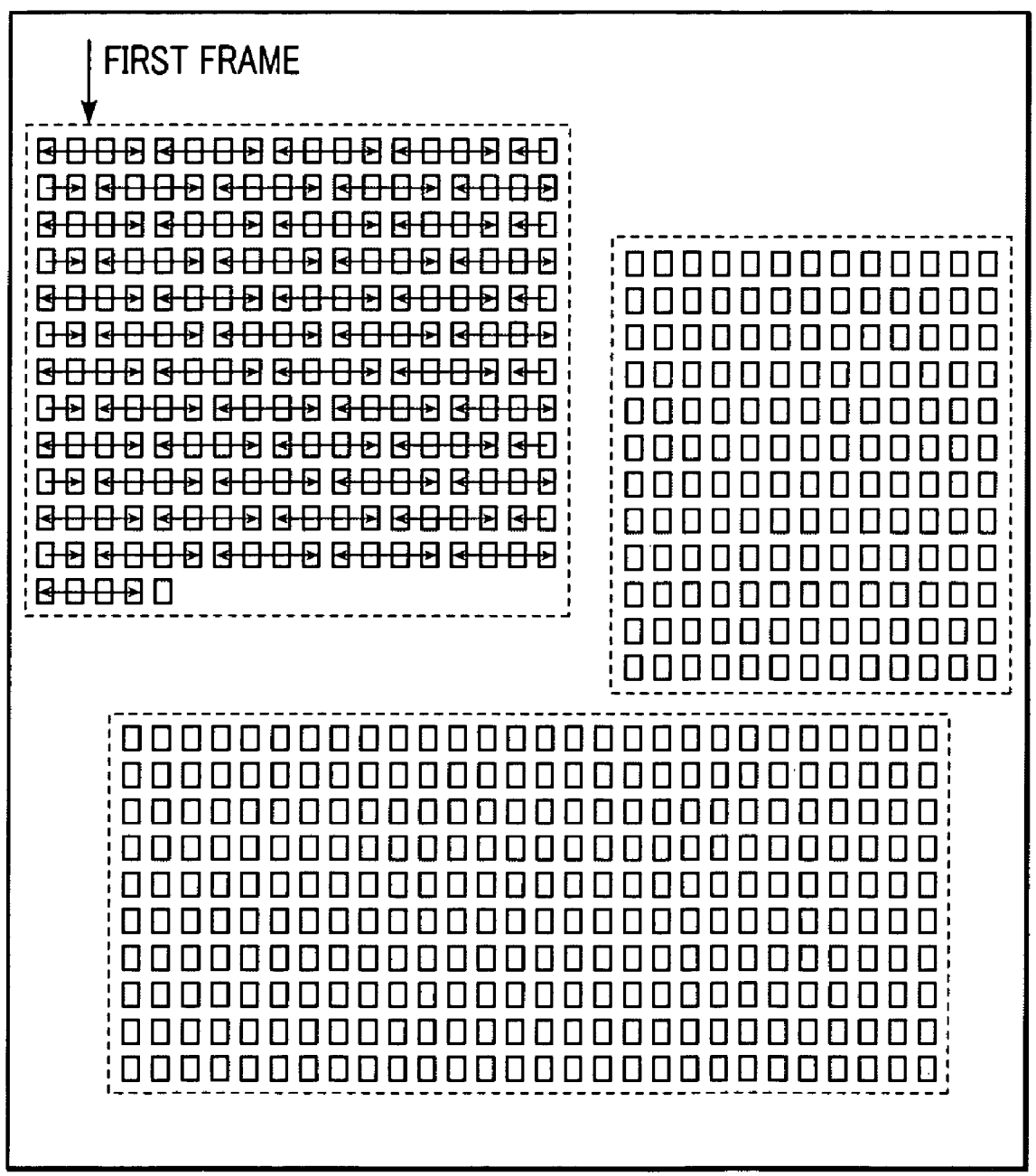
FIG. 12 is a diagram showing how digital watermark information is embedded in the second embodiment.
Figure 13:
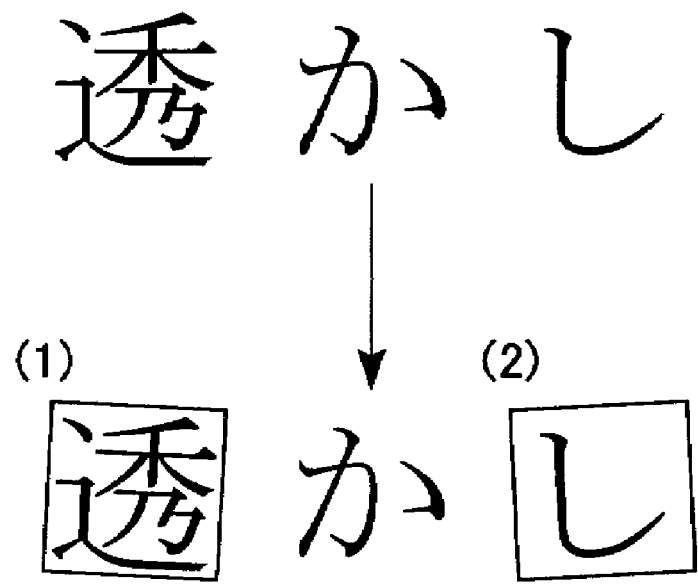
FIG. 13 is a diagram showing the related art for embedding digital watermark information by rotating characters.

FIG. 12 is a schematic diagram showing how information is embedded in the second embodiment. The process will be described below in detail. The configurations of a digital-watermark embedding apparatus and a digital-watermark extracting apparatus are the same as those in the first embodiment except in that the area ordering unit 103 is replaced by a frame constructing unit.

Figure 9:
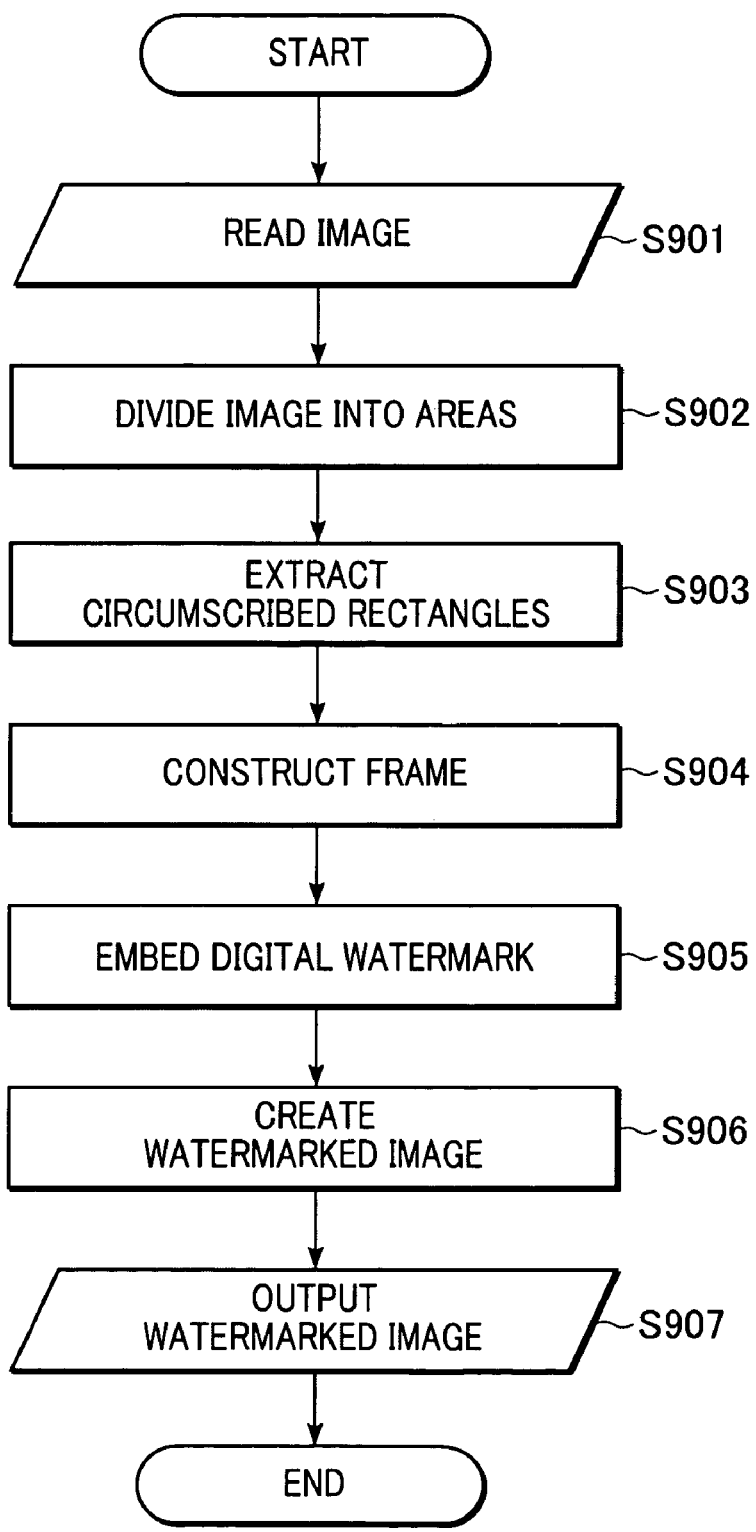
FIG. 9 is a diagram for explaining the procedure of embedding digital watermark information according to a second embodiment.

FIG. 9 is a flowchart for explaining the entire procedure of the digital-watermark-information embedding method according to the second embodiment. The flowchart shown in FIG. 9 differs from the flowchart shown in FIG. 3 in that the area ordering process in step S303 is omitted and in that a frame constructing process is executed in step S904 subsequent to the circumscribed-rectangle extracting process in step S903.

Figure 11:
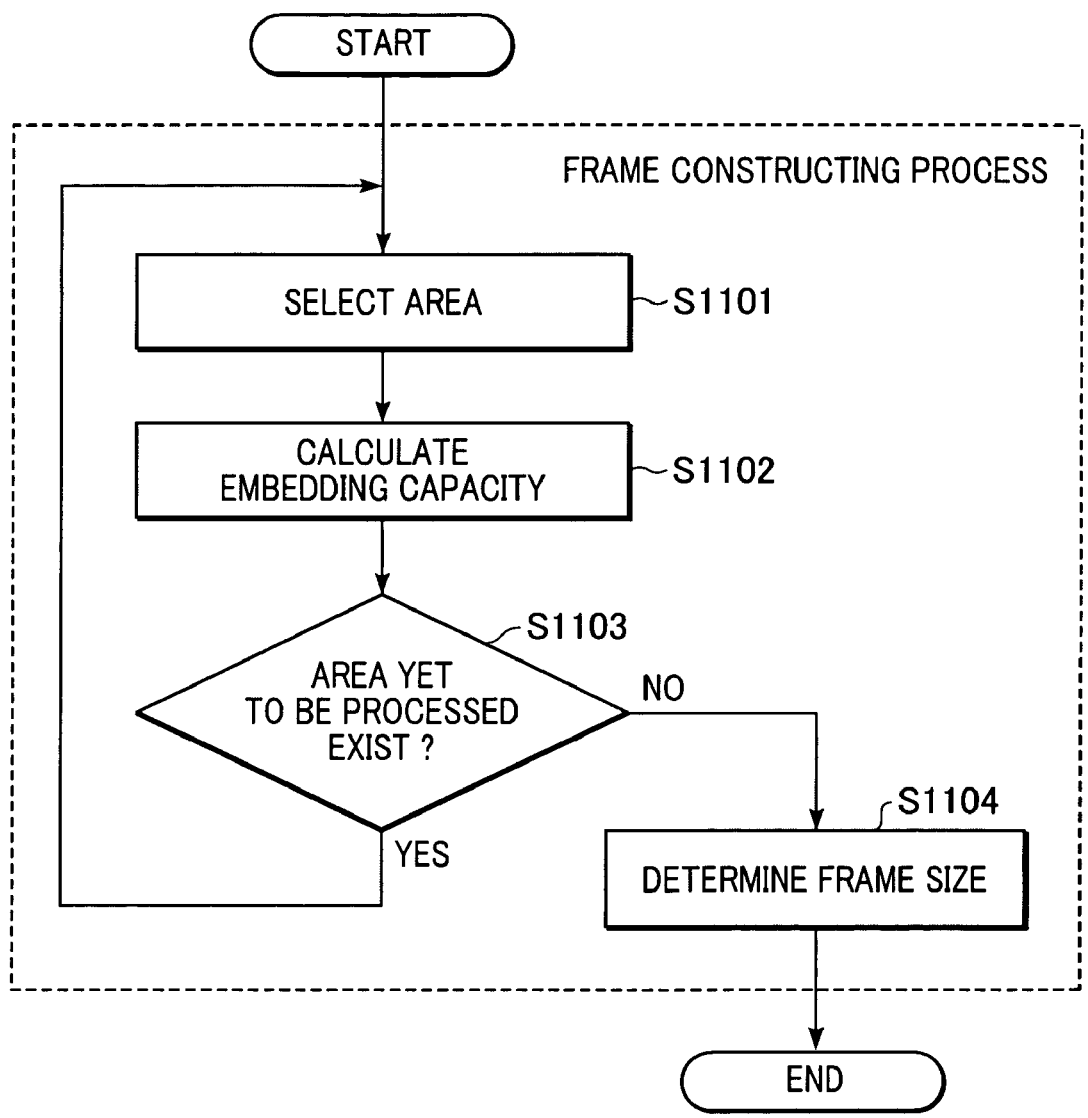
FIG. 11 is a diagram for explaining the concept of a frame in the second embodiment.

FIG. 11 is a flowchart for explaining the frame constructing process in the second embodiment. First, in step S1101, an area to be processed is selected. Then, in step S1102, the amount of digital watermark information that can be embedded in the area selected is calculated.

For example, if digital watermark information is embedded using the tilt angle of a character with a step size of two degrees of rotation, since four bits can be embedded in a single character, the amount of information can be calculated by multiplying the number of circumscribed rectangles by four. That is, the number of characters serves as base data for calculating the embedding capacity.

In step S1103, it is determined whether any character area that is yet to be processed exists. If all the character areas have been processed (No in step S1103), a frame size is determined in step S1104 based on the amount of information that can be embedded in each of the areas. For example, if ASCII characters are to be embedded, the number of circumscribed rectangles to be included in a frame is determined such that the amount of information that can be embedded is at least an integer multiple of eight bits. Thus, in a document area including two or more characters, each set of two characters is considered as one frame. Accordingly, the embedding capacity of one frame is 2×4=8 bits.

The procedure of embedding digital watermark information is basically the same as in the first embodiment described earlier. However, information indicating an order for embedding a digital watermark for a document is recorded in the first frame. Alternatively, key information indicating an order for reading areas may be provided. That is, in the digital-watermark embedding method according to this embodiment, information regarding an order for embedding digital watermark information is provided as key information or is stored in each area.

Figure 10:
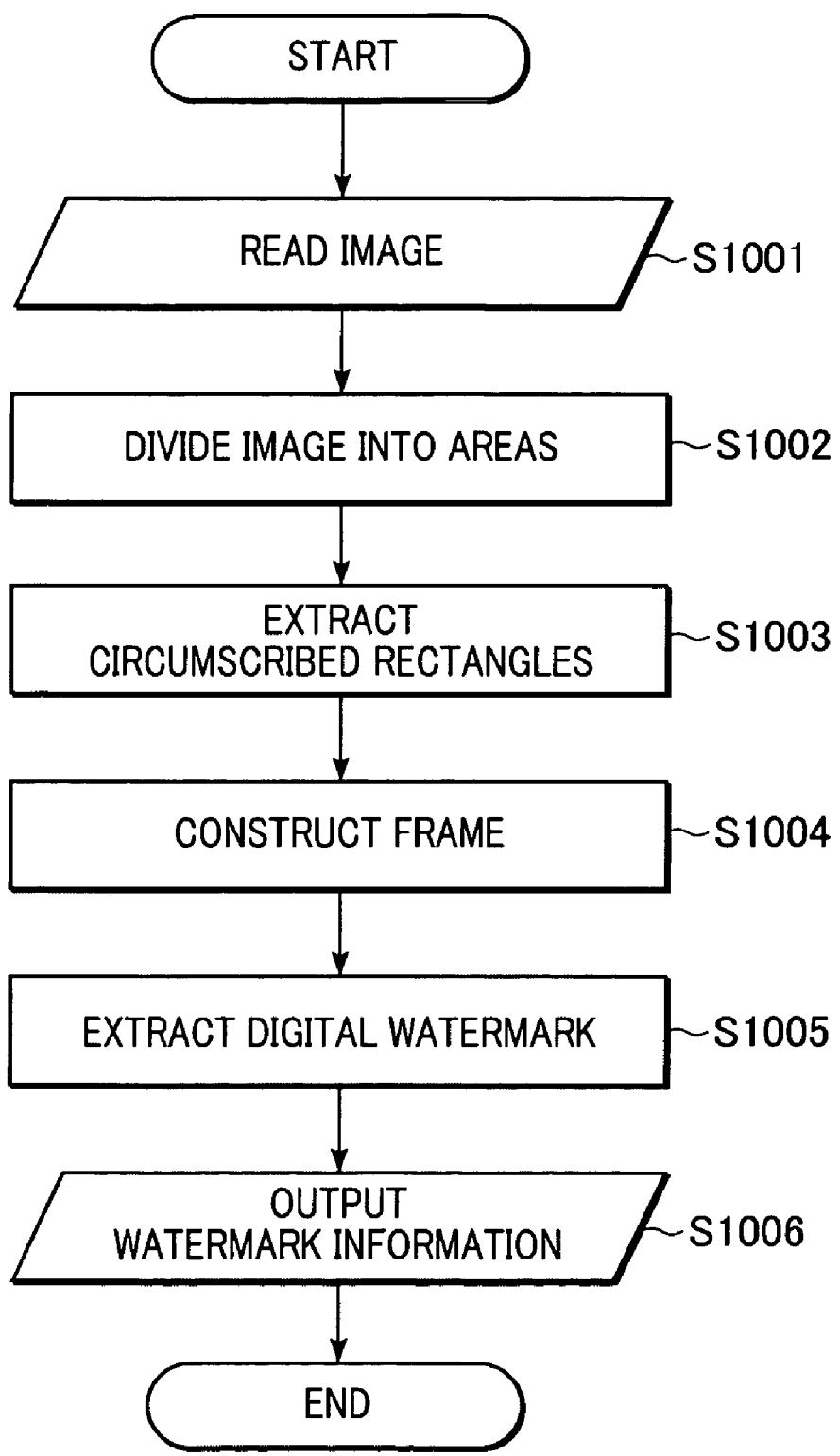
FIG. 10 is a diagram for explaining the procedure of extracting digital watermark information according to the second embodiment.

FIG. 10 is a flowchart showing the procedure of a digital-watermark extracting process according to the second embodiment. The flowchart shown in FIG. 10 differs from the flowchart shown in FIG. 4 in that the area ordering process in step S403 is omitted and in that a frame constructing process (step S1004) is added subsequent to the circumscribed-rectangle extracting process in step S1003. Optionally, a step for ordering areas according to a particular ordering rule that allows unambiguous ordering may be included, as in the first embodiment.

The procedure of extracting information is basically the same as in the first embodiment. However, information indicating an order for embedding a digital watermark for a document is recorded in the first frame. Alternatively, key information indicating an order for reading areas may be provided. That is, in the digital-watermark extracting method according to this embodiment, key information regarding an order for extracting digital watermark information is provided or information regarding an order for extracting digital watermark information is stored in each area.

Also in this embodiment, areas must be ordered in advance at the embedding side, and the method of ordering is the same as that in the first embodiment. That is, areas are ordered by size or by the number of characters with emphasis on "the amount of information" as in the first embodiment.

Furthermore, the three parameters described in relation to the first embodiment, that is, the "amount of information" of digital watermark information that can be embedded in an image, "robustness" that allows digital watermark information to be correctly extracted even after an image in which the digital watermark information is embedded has been modified, and degradation of "image quality" that occurs when digital watermark information is embedded in an image may be considered to make similar modifications described in relation to the first embodiment.

If the ordering criterion is to be related to "robustness", document areas are ordered in decreasing order of the size of characters included in each of the document areas. For that purpose, the order of steps S303 and S304 shown in FIG. 3 is reversed, and step S303 shown in FIG. 6 is replaced by step S303 shown in FIG. 17. The procedure becomes as follows. When an image has been divided into areas by the area dividing unit 102 or 202 in step S302, prior to ordering the areas in step S303, the circumscribed-rectangle extracting unit 104 or 204 in step S304 extracts circumscribed rectangles.

Then, in step S303, the average size of circumscribed rectangles in each of the areas is calculated in step S1701. Then, the areas are ordered according to the average values in step S1702.

If it is determined in step S1703 that a set of areas having the same average value exists, the areas are ordered in step S1704 based on the coordinate values thereof according to the second criterion described earlier.

Subsequent steps (S305 and later) are the same as the corresponding steps in the embodiment described earlier.

If the ordering criterion is to be related to "image quality", areas are ordered with as much consideration as possible paid for the user to areas where a watermark is embedded, that is, areas where image quality will be degraded. For example, a title constitutes an area that is likely to be noticed, so that degradation in image quality will be noticeable if a digital watermark is embedded therein. In this example, an area where a user does not wish to embed digital watermark is specified interactively, and the area specified is exempted from ordering.

FIG. 18 is a flowchart showing a procedure of the above operation. The procedure shown in FIG. 18 is basically the same as that shown in FIG. 3. However, steps described below differ. Next to step S304, the result of division into areas is displayed over the document image on the monitor 1606 in step S1801, as shown in FIG. 8. Then, in step S1802, the user is allowed to select which of the areas is to be exempted from embedding of a digital watermark. Subsequent steps (S305 and later) are the same as the corresponding steps in the embodiment described earlier.

As will be understood from the procedure described above, the ordering based on "image quality" can be employed in combination with the ordering based on "amount of information".

Also, an ordering criterion based on a combination of "image quality" and "robustness" can be employed by inserting steps S1801 and S1802 in the ordering operation based on "robustness" (i.e., the flowchart in which the order of steps S303 and S304 is reversed).

An ordering criterion based on a combination of a plurality of parameters will be even more effective.

In order for the method of the present embodiment to embed digital watermark information continuously over a plurality of areas, which is an object of the present invention, information indicating an order of an area can be represented by adding a special mark (e.g., a two-dimensional bar code representing an area number) at a predetermined position of each area (e.g., the top right corner of a document area that will be recognized as an area). In that case, digital watermark information can be embedded continuously over a plurality of areas without considering boundaries of the areas. Obviously, it is possible to employ the digital-watermark embedding algorithm employed in the first embodiment, or an embedding algorithm in which space lengths are adjusted instead of the embedding algorithm employed in this embodiment.

Other Embodiments

Although areas with the same size are ordered by distance from the top left of a document image in the first embodiment, the reference point may be a different point, such as the top right. Furthermore, although areas with the same size are ordered by distance from the top left of a document image in the first embodiment, the ordering may be based on the magnitudes of the x and y coordinate values instead of the distance. That is, areas may be ordered according to an ordering criterion based on a relationship of relative positions of character areas, or a relationship of absolute positions with, for example, the top left as a reference point.

Furthermore, although circumscribed rectangles are extracted after ordering areas based on sizes of the areas and positional relationship of the areas in the first embodiment, areas may be ordered by the numbers of characters included in the respective areas after circumscribed rectangles have been extracted. Obviously, it is within the scope of the present invention to combine the ordering criteria described above with appropriately priorities.

Although a digital watermark is embedded by rotating (tilting) characters in the first embodiment, alternatively, a digital watermark may be embedded by adjusting spaces between characters. Digital watermarking by adjusting spaces between characters is described below.

Figure 14:
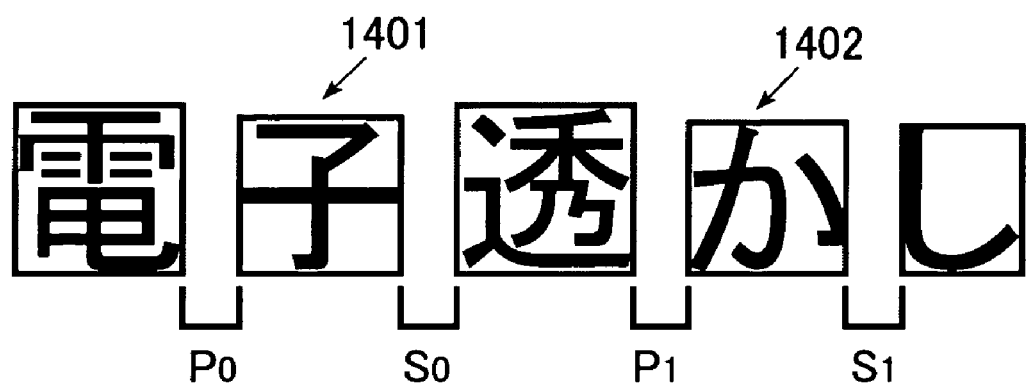
FIG. 14 is a diagram showing a document image in which digital watermark information is yet to be embedded.
Figure 15:
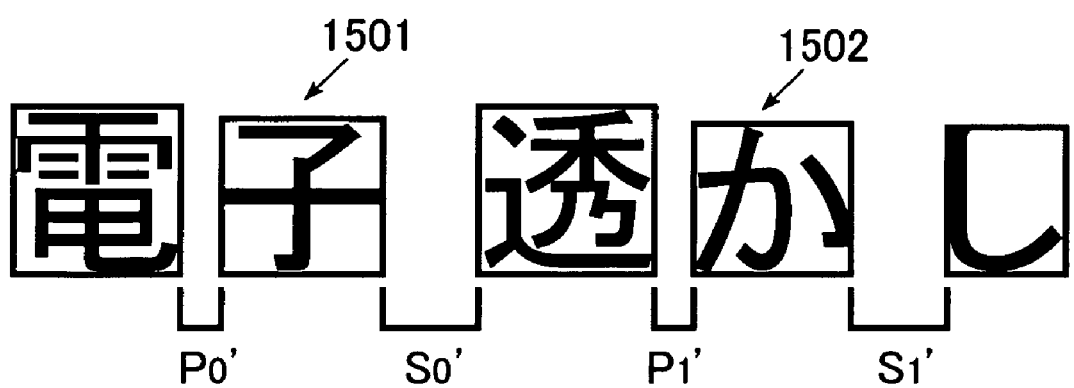
FIG. 15 is a diagram showing a document image in which digital watermark information has been embedded.

FIG. 14 is a diagram showing a part of a document image in which digital watermark information is yet to be embedded. FIG. 15 is a diagram showing the part of the document image shown in FIG. 14 after digital watermark information has been embedded therein. When digital watermark information has been embedded, space lengths P0, S0, P1, and S1 between characters shown in FIG. 14 become space lengths P0', S0', P1', and S1' between characters shown in FIG. 15.

In FIGS. 14 and 15, five characters and four spaces are shown. In this embodiment, two space lengths are assigned to one bit, so that two bits of information can be embedded using four spaces.

For example, suppose that P>S represents "1" and that P<S represents "0". Referring to FIG. 4, a character 1401 between P0 and S0 is shifted left, and a character 1402 between P1 and S1 is shifted right. The result is a modification of the characters as represented by 1501 and 1502 of FIG. 15. In this case, regarding the character string shown in FIG. 15, P0'<S0' and P1'<S1', so that a bit string representing "01" is embedded.

The objects of the present invention can also be achieved by providing a system or apparatus with a storage medium (or recording medium) having recorded thereon program code of software for implementing the functions of the embodiments described above so that a computer (or a CPU or MPU) of the system or apparatus is allowed to read and execute the program code stored in the storage medium. In that case, the functions of the embodiments described above are implemented by the program code read from the storage medium, so that the storage medium storing the program code constitutes the present invention.

Furthermore, instead of achieving the functions of the embodiments described above by a computer reading and executing the program code, the functions of the embodiments described above may be achieved by executing a part or the entirety of actual processing based on instructions of the program code by an operating system (OS) or the like running on the computer, which is also within the scope of the present invention.

Furthermore, the program code read from the storage medium may be written to a memory of a functional extension card inserted into the computer or a functional extension unit connected to the computer so that the functions of the embodiments described above will be achieved by executing a part or the entire processing based on instructions of the program code by a CPU or the like of the functional extension card or functional extension unit, which is also within the scope of the present invention.

When the present invention is implemented in the form of the storage medium, the storage medium stores the program code corresponding to the flowcharts described above.

As described above, the present invention allows a digital watermark to be embedded continuously even in an image in which a plurality of areas is disposed discretely, such as a document image.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method of embedding digital watermark information in a document image, comprising:
    a step of dividing the document image into a plurality of document areas;
    a step of determining an order of the embedding for the plurality of document areas based on a size of the document area or a number of characters included in the document area,
    wherein the order of the embedding is determined based on the relationship of relative positions of the document areas in a case where the plurality of document areas have the same size of the document area or the same number of characters included in the document area; and
    a step of embedding the digital watermark information over the plurality of document areas in the document image in accordance with the determined order of the embedding.

2. A method according to claim 1, further comprising a circumscribed-rectangle detecting step of detecting rectangles circumscribed respectively to characters included in the document image, wherein the digital watermark information is embedded in the embedding step based on the circumscribed rectangles detected.

3. A method according to claim 1, further comprising a step of exempting a part of the plurality of document areas from an object of the embedding prior to the determining step.

4. A method according to claim 1, further comprising a second embedding step of embedding, in the plurality of document areas, information representing the order of the embedding.

5. A method according to claim 1, wherein digital watermark information having one bit is embedded in the embedding step by rotating a character included in each of the document areas.

6. A method according to claim 1, wherein digital watermark information having a predetermined number of bits larger than one bit is embedded in the embedding step by rotating a character included in the each of the document areas.

7. A method according to claim 1, wherein digital watermark information is embedded in the embedding step by adjusting a gap between characters included in each of the document areas.

8. A method according to claim 1, wherein digital watermark information is embedded in the embedding step based on a predetermined number of characters included in each of the document areas.

9. An apparatus for embedding digital watermark information in a document image, comprising:
  an area dividing unit configured to divide the document image into a plurality of document areas;
  a determination unit configured to determine an order of the embedding for the plurality of document areas based on a size of the document area or a number of characters included in the document area,
  wherein the order of the embedding is determined based on a relationship of relative positions of the document areas in a case where the plurality of document areas have the same size of the document area or the same number of characters included in the document area; and
  an embedding unit configured to embed the digital watermark information over the plurality of document areas in the document image in accordance with the determined order of the embedding.

10. A computer readable medium storing a program for embedding digital watermark information in a document image, the program comprising:
a step of dividing the document image into a plurality of document areas;
  a step of determining an order of the embedding for the plurality of document areas based on a size of the document area or a number of characters included in the document area,
  wherein the order of the embedding is determined based on the relationship of relative positions of the document areas in a case where the plurality of document areas have the same size of the document area or the same number of characters included in the document area; and
  a step of embedding the digital watermark information over the plurality of document areas in the document image in accordance with the determined order of the embedding.

11. A method for detecting digital watermark information in a document image, comprising:
  a step of dividing the document image into a plurality of document areas;
  a step of determining an order of the detecting for the plurality of document areas based on a size of the document area or a number of characters included in the document area,
  wherein the order of the detecting is determined based on a relationship of relative positions of the document areas in a case where the plurality of document areas have the same size of the document area or the same number of characters included in the document area; and
  a step of detecting the digital watermark information over the plurality of document areas in the document image in accordance with the determined order of the detecting.

12. An apparatus for detecting digital watermark information in a document image, comprising:
  a dividing unit configured to divide the document image into a plurality of document areas;
  a determination unit configured to determine an order of the detecting for the plurality of document areas based on a size of the document area or a number of characters included in the document area,
  wherein the order of the detecting is determined based on a relationship of relative positions of the document areas in a case where the plurality of document areas have the same size of the document area or the same number of characters included in the document area; and
  a detecting unit configured to detect the digital watermark information over the plurality of document areas in the document image in accordance with the determined order of the embedding.

13. A computer readable medium storing a program for detecting digital watermark information in a document image, the program comprising:
a step of dividing the document image into a plurality of document areas;
  a step of determining an order of the detecting for the plurality of document areas based on a size of the document area or a number of characters included in the document area,
  wherein the order of the detecting is determined based on the relationship of relative positions of the document areas in a case where the plurality of document areas have the same size of the document area or the same number of characters included in the document area; and
  a step of detecting the digital watermark information over the plurality of document areas in the document image in accordance with the determined order of the embedding.

* * * * *